United States Patent
Bhadra et al.

(10) Patent No.: US 10,481,674 B2
(45) Date of Patent: Nov. 19, 2019

(54) AUTONOMOUS HARDWARE FOR APPLICATION POWER USAGE OPTIMIZATION

(71) Applicant: NXP USA, Inc., Austin, TX (US)

(72) Inventors: Jayanta Bhadra, Austin, TX (US); Wen Chen, Austin, TX (US); Monica Farkash, Austin, TX (US); Kuo-Kai Hsieh, Goleta, CA (US)

(73) Assignee: NXP USA, Inc., Austin, TX (US)

( * ) Notice: Subject to any disclaimer, the term of this patent is extended or adjusted under 35 U.S.C. 154(b) by 63 days.

(21) Appl. No.: 15/214,599

(22) Filed: Jul. 20, 2016

(65) Prior Publication Data

US 2018/0024614 A1    Jan. 25, 2018

(51) Int. Cl.
*G06F 1/3287* (2019.01)
*G06F 1/3228* (2019.01)

(52) U.S. Cl.
CPC .......... *G06F 1/3287* (2013.01); *G06F 1/3228* (2013.01)

(58) Field of Classification Search
CPC .................................................. G06F 1/3287
See application file for complete search history.

(56) References Cited

U.S. PATENT DOCUMENTS

| | | | |
|---|---|---|---|
| 5,668,992 A | 9/1997 | Hammer et al. | |
| 5,832,286 A * | 11/1998 | Yoshida | G06F 1/26 713/324 |
| 7,007,247 B1 | 2/2006 | Wang et al. | |
| 7,174,468 B2 | 2/2007 | Gary et al. | |
| 7,257,723 B2 | 8/2007 | Galles | |
| 2014/0089699 A1 * | 3/2014 | O'Connor | G06F 1/324 713/322 |

* cited by examiner

*Primary Examiner* — Kim Huynh
*Assistant Examiner* — Eric Chang

(57) ABSTRACT

Self-configured, power-aware circuitry configured to enhance power efficiency within integrated circuitry by self-calibrating the power consumption utilized within the integrated circuitry according to the requirements of an application program running within the integrated circuitry. The power consumption is self-calibrated within the integrated circuitry on a per application-based manner so that the integrated circuitry can be implemented with a plurality of various generalized functionalities, each of which may or may not be utilized while a specific application program is running within the integrated circuitry. Power consumption within the integrated circuitry is reduced by independently and dynamically controlling multiple power sections delineated within the integrated circuitry.

13 Claims, 7 Drawing Sheets

|  | 101a | 101b | 101c | ... | 101N |
|---|---|---|---|---|---|
| 1st SELECTION | OFF | ON | ON | ... | ON |
| 2nd SELECTION | ON | OFF | ON | ... | ON |
| ⋮ | ⋮ | ⋮ | ⋮ | ⋮ | ⋮ |
| Nth SELECTION | ON | ON | ON | ... | OFF |

| ORANGE | 101a | 101b | 101c | ... | 101N |
|---|---|---|---|---|---|
| BASELINE | OFF | ON | ON | ... | OFF |

AUTONOMOUS HARDWARE FOR APPLICATION POWER USAGE OPTIMIZATION

TECHNICAL FIELD

The present invention relates in general to management of power consumption in electronic circuitry, and in particular, to reducing power consumption as a function of the requirements of currently operating application programs.

BACKGROUND

Power consumption has become an important optimization metric in the design of micro-electronic circuits. Optimizing the power consumption may be achieved at various abstract levels of design, from algorithmic and system levels down to layout and circuit levels. In general, the power consumption of an electronic system may be dependent upon its capacitance, the clock signals, or its power supply voltage.

The need to conserve power consumption within an integrated circuit ("IC") chip becomes more critical for those IC chips utilized within the Internet of Things ("IoT"), because such IC chips are often required to be portable, ubiquitous, and very small (and thus being powered by small, low power batteries). Additionally, in order to competitively manufacture and market such IC chips to a wide variety of end users, such IC chips need to be robustly designed for use in a wide variety of potential applications.

One possible solution is to design and manufacture an IC chip possessing only the minimal hardware required for performing a particular end user application, which can then be customized so as to minimize its size, needed circuitry, and thus required power for performing the particular set of functions for the dedicated application. Though such an IC chip designed and manufactured with such application dedicated hardware may result in an ideal solution, it is not financially feasible for an IC manufacturer to produce and sell such customized solutions for each different customer.

The prior art has attempted to address the foregoing problems in a couple of different ways. A first solution is to write specialized software code for the end user's application, which activates and deactivates power to various portions of circuitry on an as-needed basis. However, such a solution requires writing of a specific power management code for each application to be run by the IC chip (or for the same application to be run on a different IC chip), which can be very expensive to design, implement, and debug since the specialized software code is not transferable and usable within the IC chip when it is intended for use with other applications. Furthermore, such a complex endeavor is error prone, because it requires a thorough understanding of each application to be run by the IC chip. A second solution is to manage the clock gating within the various portions of the IC in order to deactivate portions of the IC when it is known that those portions of the IC are not going to be effective in that instance. This solution is also not economically feasible because the hardware must be designed to take into account circumstantial internal conditions within the integrated circuit as they arise during the often numerous alternative variations in how portions of the circuitry are utilized over a wide variety of conditions in which the applications may operate. The circuit designer has to thus design the clock gating at the logic level through logic restructuring and operand isolation in order to take into account each of these potential variations.

DETAILED DESCRIPTION

Figure 1:
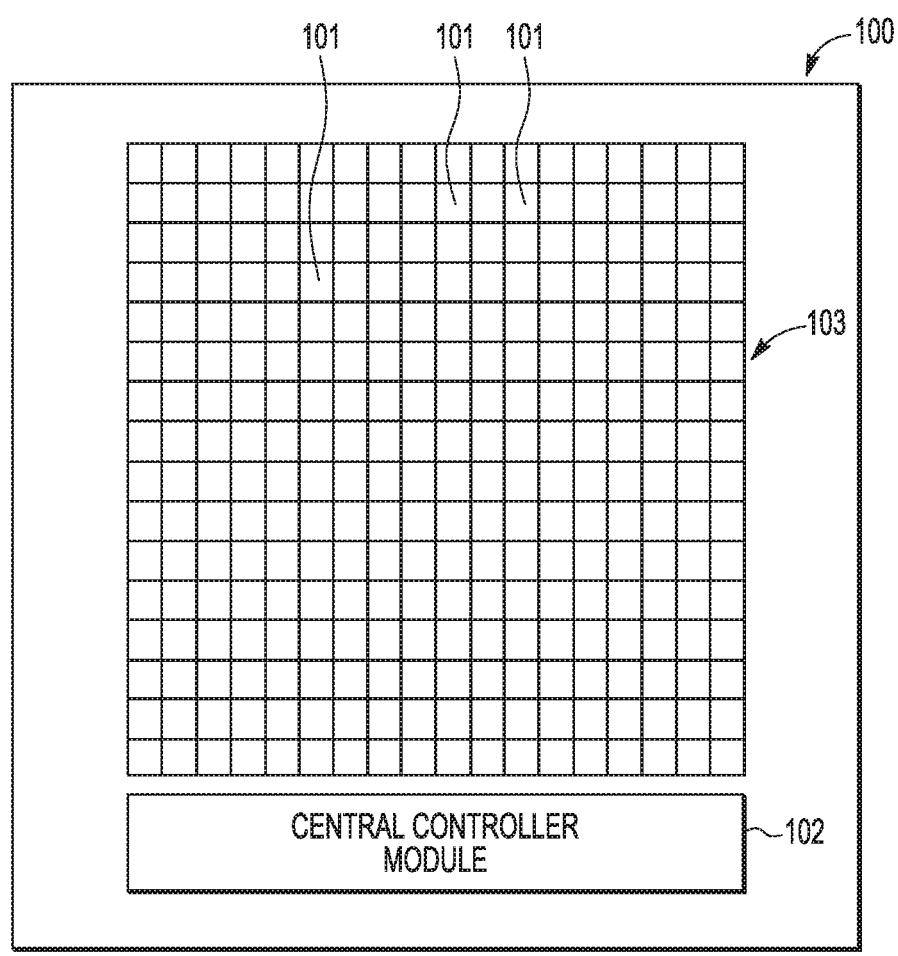
FIG. 1 conceptually depicts integrated circuitry partitioned into a plurality of power sections managed by a central controller module, in accordance with embodiments of the present invention.

Aspects of the present invention provide self-configured, power-aware circuitry configured to enhance power efficiency within integrated circuitry while it is running an application program. An application program can be any software implementation of the task, or tasks, the integrated circuitry is expected to execute for the device it is implemented within. The self-configured, power-aware circuitry self-calibrates an amount of power consumption utilized within the integrated circuitry according to the actual requirements of an application program running within the integrated circuitry in order to reduce its overall power consumption. Power consumption, as used herein, refers to the amount of electrical energy over time consumed by electronic circuitry to operate.

Aspects of the present invention autonomously self-calibrate the power consumption used within the integrated circuitry on a per application-based manner so that the integrated circuitry can be implemented with a plurality of various generalized functionalities, each of which may or may not be utilized while a specific application program is running within the integrated circuitry. Therefore, aspects of the present invention configure the integrated circuitry to optimally operate with minimal, or at least reduced, power consumption without significantly sacrificing performance. Aspects of the present invention thus lower power consumption within the integrated circuitry by independently controlling each of a plurality of power sections (defined hereinafter), which may be performed in a dynamic manner. In order to delineate these power sections within integrated circuitry, all or a portion of the integrated circuitry can be divided into regions having different functionalities, wherein circuit components within a particular power section have the same power profile. Generally, power consumption of integrated circuitry may be dependent upon its capacitance, the clock signal, and/or a power supply voltage level. Therefore, a power profile for a power section during a particular state (e.g., a mode of operation) may be based upon a power supply voltage applied to the power section, a clock signal (e.g., a synchronous clock signal) applied to the power section, or any other designation, factor, or parameter affecting the consumption of power by circuit components within that power section. A power section may include any partition of circuit components separate from other circuit components within the integrated circuitry, wherein such a partition of circuit components can be turned on and off independently from the other circuit components within the integrated circuitry. Non-limiting examples of power sections can include an arithmetic logic unit, a floating point unit, a direct memory access ("DMA") controller, a universal serial bus ("USB") controller, an analog-to-digital ("ADC") converter, etc.

Aspects of the present invention enable an integrated circuit manufacturer to design and manufacture an integrated circuit that can be implemented to perform various different application programs by various end users, while controlling the power consumption within the integrated circuitry. A non-limiting example might be for a particular end user to utilize the manufactured integrated circuit to run an application program within a device such as an air conditioning ("A/C") controller, while a different end user might utilize the same integrated circuit to run an application program for utilization within an electric motor controller. Nevertheless, embodiments of the present invention are configured to control (e.g., minimize, or at least reduce) the power consumption levels of circuitry within the integrated circuit regardless of which of these end user application programs the integrated circuit is utilized to run.

Moreover, embodiments of the present invention may also be configured to control (e.g., minimize, or at least reduce) the power consumption of circuitry within the integrated circuit for a particular end user application program as the running of that application program encounters various different operating conditions or parameters. As an example, taking into consideration the previously noted exemplary A/C controller, the power requirements by circuitry within the integrated circuit may be different for implementations of the A/C controller within a colder environment (e.g., the state of Alaska) versus within a warmer environment (e.g., the state of Texas), or may simply encounter different operating conditions during its utilization at a single location, such as when the temperature of the environment within which the A/C controller is utilized varies over a period of time (e.g., hours, days, months, etc.). For example, a particular delineated power section within the integrated circuitry may not be required for certain operating conditions during the running of an application program (e.g., for temperatures above a certain threshold).

Though embodiments of the present invention are described herein with respect to managing power consumption within integrated circuitry, embodiments of the present invention may also be applied to any circuitry, including discrete electronic components and combination of discrete electronic components and integrated circuit components. As such, any of the power sections described herein may include discrete electronic components. Furthermore, though embodiments of the present invention are described herein as being implemented on an integrated circuit chip, embodiments of the present invention are not to be limited as such. The integrated circuitry 103 may be implemented within any hardware configuration.

FIG. 1 conceptually depicts integrated circuitry 103, which represents all or a portion of the integrated circuitry implemented within an exemplary integrated circuit ("IC") 100 (e.g., an IC chip). Within embodiments of the present invention, the term "integrated circuitry" may refer to any number of circuit components implemented on an integrated circuit. The integrated circuitry 103 may be configured with various sections of circuit components for implementing various different functionalities commonly found within such an integrated circuit 100.

At the design stage, the manufacturer of the integrated circuit 100 can partition all or a portion of the integrated circuitry 103 into a plurality of delineated power sections 101 (wherein individual power sections may be designated herein as 101a, 101b, . . . 101N; where N>1) any manner as desired by the integrated circuit manufacturer. The power sections 101 are non-overlapping in that each power section 101 is configured so that it can be turned on or off independently from other power sections 101, such as by activation or deactivation of a clock signal utilized for operating the circuit components within the particular power section 101 (e.g., a synchronous clock signal used by circuit components within the power section). As a result, the central controller module 102 is configured to independently turn on or turn off each of the power sections 101. Note that other embodiments of the present invention may have one or more groups of overlapping power sections, which can be configured so that such overlapping power sections can be turned on or off in combination with each other, such as under certain operating conditions.

For purposes of describing embodiments of the present invention a power section is referred to as being "turned on" and "turned off" by an activation or deactivation of any factor that affects the amount of power consumed (i.e., the power consumption) by circuit components in the power section. Such a factor may be the application of a clock signal and/or a power supply voltage to any one or more circuit components in the power section. For example, a power section may be referred to herein as "turned on" by the activation (e.g., application or transmission) of a clock signal and/or a power supply voltage signal to circuit components within the power section. Likewise, a power section may be referred to herein as "turned off" by the deactivation (e.g., disabling, blocking, or removal) of the clock signal and/or the power supply voltage signal to circuit components within the power section. Deactivation of a clock signal from a power section results in circuit components within the power section being unable to process (i.e., gate) data signals by the circuit components. Regardless of the utilized technique, when the power section is "turned off," its power consumption is reduced from an amount relative to when the power section is "turned on."

Figure 2:
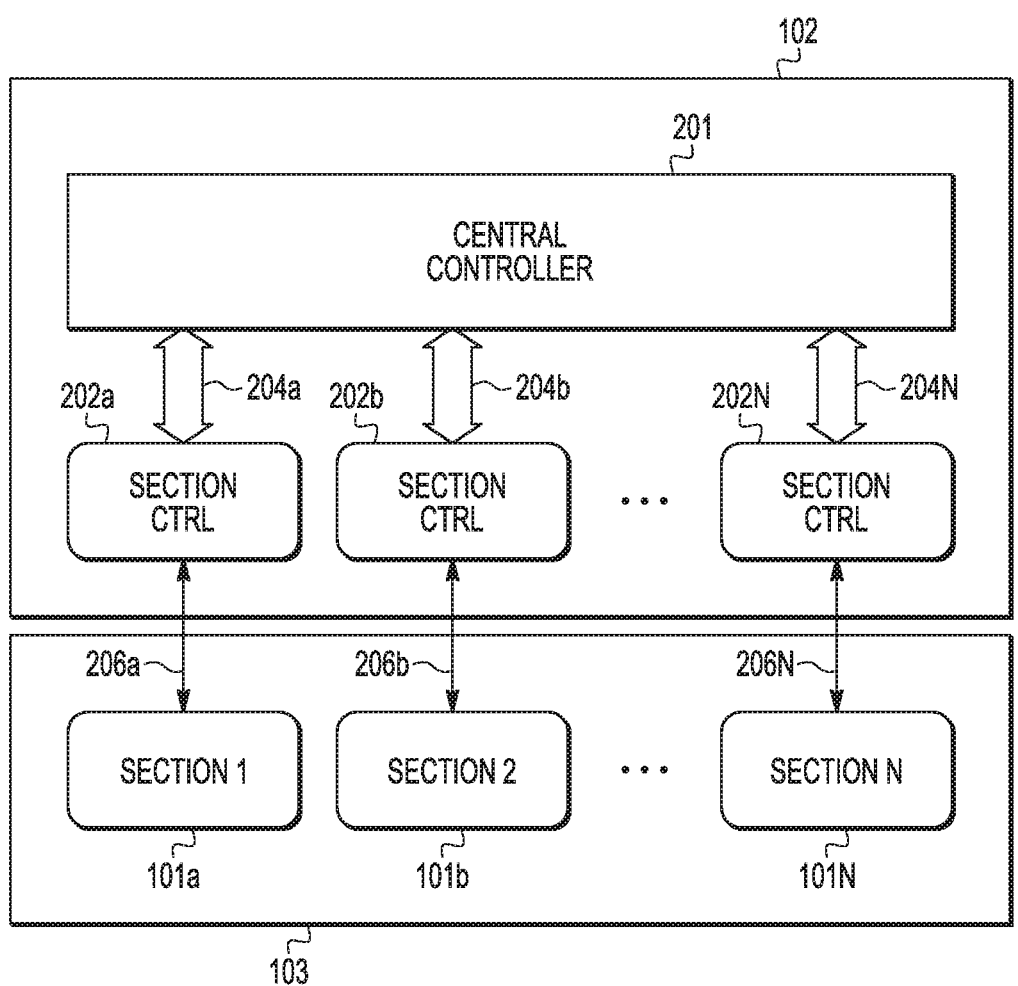
FIG. 2 illustrates a block diagram of a coupling of power sections to a central controller module in accordance with embodiments of the present invention.

FIG. 2 illustrates a block diagram of a central controller module 102 and how it may communicate with the power sections 101 delineated within the integrated circuitry 103, such as conceptually and exemplary depicted in FIG. 1. The integrated circuitry 103 includes N (where N>1) power sections 101, wherein each such power section is labeled in FIG. 2 as power sections 101a, 101b, . . . 101N. The central controller module 102 includes circuitry implementing a central controller 201 that communicates via signal lines 204, labeled as signal lines 204a, 204b, . . . 204N, to N section controllers 202, labeled as section controllers ("CTRLs") 202a, 202b, . . . 202N. Each of these section controllers 202 then communicates via signal lines 206, labeled as signal lines 206a, 206b, . . . 206N, to each of the N power sections 101a, 101b, . . . 101N, respectively. For example, communication between the power section 101a and the section controller 202a is implemented through the signal line 206a. Correspondingly, the section controller 202a communicates via the signal line 204a with the central controller 201. In this manner, the central controller 201 is able to independently monitor the activity, and control the turning on and off, of each of the power sections 101 through the section controller 202 assigned to that power section 101. Further details of the central controller 201 are further described herein with respect to FIG. 4.

Note that within embodiments of the present invention, though FIGS. 1 and 2 depict the section controllers 202a, 202b, . . . 202N as part of the central controller module 102, the section controllers 202a, 202b, . . . 202N may be implemented in proximity to their associated power sections 101a, 101b, . . . 101N within the integrated circuitry 103. Additionally, within embodiments of the present invention, all or a portion of the central controller module 102 may be implemented by circuitry within the integrated circuitry 103 and/or by other circuitry within the integrated circuit 100.

Figure 3:
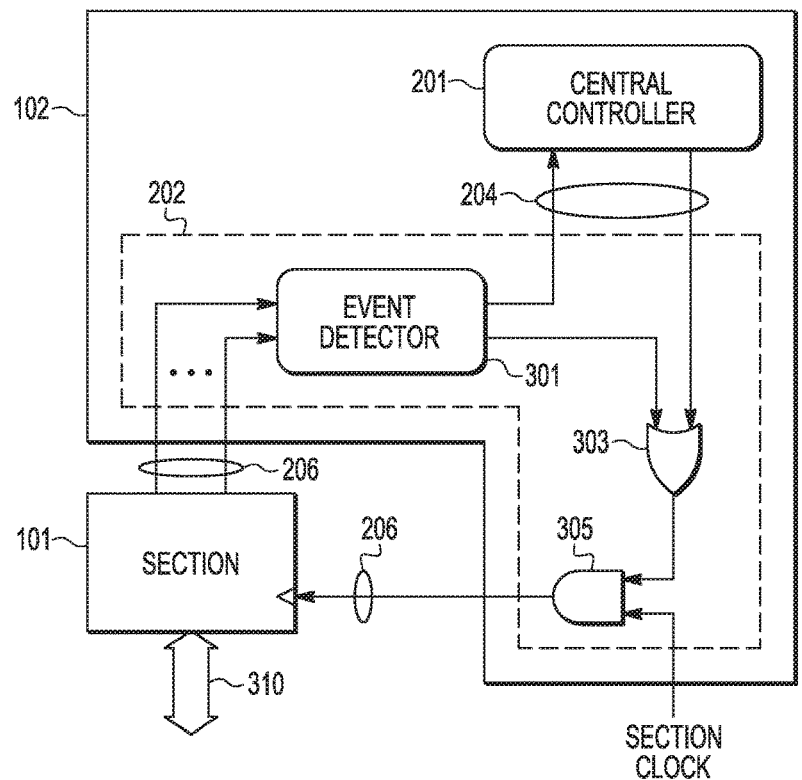
FIG. 3 illustrates a block diagram of an exemplary power consumption management performed by a central controller module configured in accordance with the present invention.

FIG. 3 illustrates a block diagram showing further details for each of the section controllers 202. As previously described with respect to FIG. 2, the central controller 201 communicates with each section controller 202 through signal lines 204. Each section controller 202 communicates with its particular power section 101 through signal lines 206. Each signal line 206 is configured to (1) communicate the status of one or more activity signals from the power section 101 to the event detector 301, and (2) apply, or transmit, the clock signal (labeled as "Section Clock" in FIG. 3) to circuit components within the power section 101 from a logic AND gate 305.

The event detector 301 identifies whether there is data processing activity (e.g., actual, or at least possible, data processing activity) within circuit components of the power section 101 during the running of an application program by monitoring when circuit components of the power section 101 receive an input of one or more data signals from other circuitry within the integrated circuit 100. For each of the power sections 101, the designer of the integrated circuit 100 can preselect which of the input data signals received by circuit components within the power section 101 to monitor, or sense. Though there may be a plurality of such input data signals received by circuit components within a particular power section 101, the event detector 301 of each particular section controller 202 may be configured to monitor only a selected number (e.g., one or more) of such input data signals that are known to always be utilized by circuit components within the particular power section 101 during the running of an application program. The communications bus 310 is illustrated to show that circuitry within the power section 101 communicates with other circuitry within the integrated circuit 100. Note that the monitoring of the input data signals by the event detector 301 may be implemented by the sensing of one or more input data signal lines transmitted within the communications bus 310.

Sensing of the receipt of such one or more input data signals by circuit components within the power section 101 may be performed in any well-known manner. And, any well-known circuitry may be implemented within the event detector 301 to monitor for the sensing of such input data signals, such as through the implementation of a well-known edge detector for each input data signal to be monitored. In such an instance, an edge detector (not shown) within the event detector 301 will trigger upon the receipt of an input data signal into circuitry of the power section 101, creating a trigger signal by the edge detector (e.g., a pulse signal of a predetermined length).

The event detector 301 then communicates the occurrences of such edge detections (e.g., the aforementioned trigger signals) to the central controller 201 via the signal lines 204, and also to the logic OR gate 303. The logic OR gate 303 also receives a signal from the central controller 201 via the signal lines 204. As will be further described hereinafter, under certain conditions, the logic OR gate 303 outputs a logic 1 value to the logic AND gate 305, which performs a logical AND of this signal with the clock signal utilized by circuit components within the power section 101 for their operation. And, as will also be further described hereinafter, application of the clock signal to circuit components within the power section 101 will only occur when the logic AND gate 305 receives a logic 1 value from the logic OR gate 303.

Note that embodiments of the present invention are not limited to the particular circuit elements shown in FIG. 3 for implementing portions of each of the section controllers 202. Instead, embodiments of the present invention may include any circuit elements configured for implementing the various functions of the section controllers 202.

Note that embodiments of the present invention will hereinafter be described as the power sections being turned on and off through the activation (e.g., application or transmission) and deactivation (e.g., disabling, blocking, or removal), respectively, of a clock signal. However, the present invention is not limited to such a specific implementation. As previously noted, any factor that affects the amount of power consumed (i.e., the power consumption) by circuit components within a power section may be manipulated. For example, instead of the clock signal, each section controller may be configured to activate and deactivate a power supply voltage in order to turn on and off, respectively, a power section.

Figure 4:
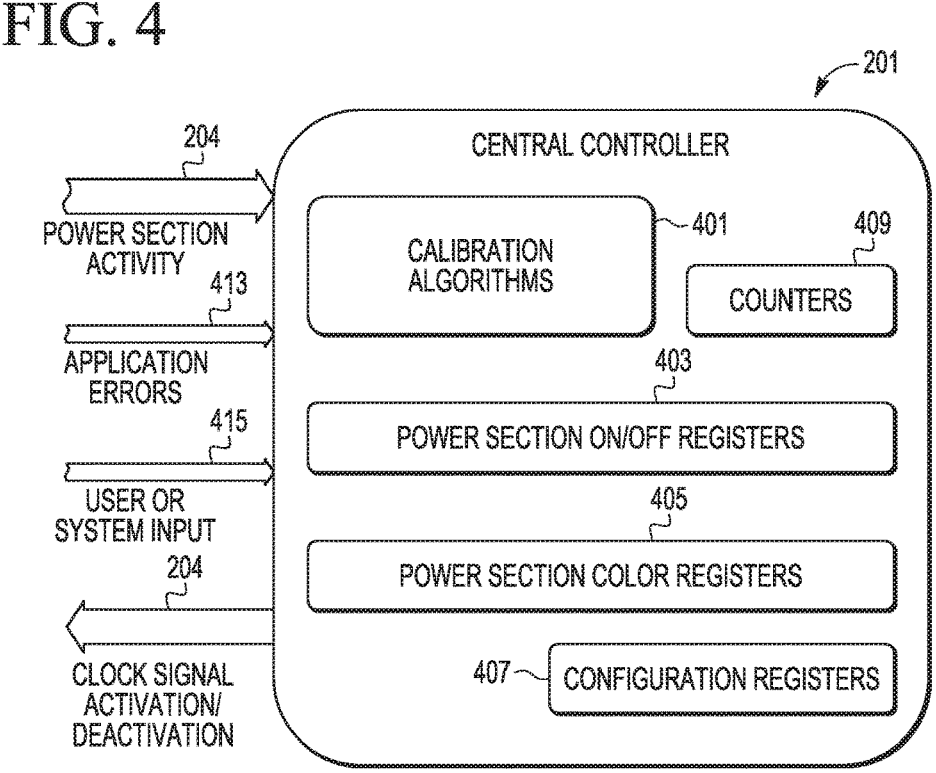
FIG. 4 illustrates a block diagram of a central controller configured in accordance with embodiments of the present invention.

FIG. 4 illustrates a block diagram showing further details of the central controller 201. The central controller 201 may be implemented in hardware or a combination of software and hardware, such as a dedicated microcontroller performing the various operations within the central controller 201 utilizing software algorithms. Alternatively, general purpose microprocessor or controller circuitry (e.g., microcontroller/CPU 1201 described herein) may be utilized to perform the various operations of the central controller 201 utilizing software algorithms. As will be further described hereinafter, the central controller 201 performs various calibration algorithms 401, such as the self-calibration process 503 described herein with respect to FIG. 6, the prevention mechanism process 507 described herein with respect to FIG. 10, and/or the recalibration process 1100 described herein with respect to FIG. 11. The central controller 201 may also be configured with circuitry for implementing one or more counters 409, as will be further described herein with respect to FIG. 10. The central controller 201 may also be configured with circuitry for implementing registers, such as for the power section on/off registers 403, the power section color registers 405, and the configuration registers 407.

As was described with respect to FIG. 3, the central controller 201 receives signals (e.g., trigger signals) indicating data processing activity (e.g., actual, or at least possible, data processing activity) within the power sections 101 from the event detectors 301 of each of the section controllers 202 via the signal lines 204, and sends signals via the signal lines 204 to each of the section controller 202 for activating and deactivating the clock signals to each of the power sections 101. The central controller 201 may also receive application program errors via the signal lines 413, as further described herein with respect to FIG. 11. The section controller may also receive one or more user and/or system input signals via one or more signal lines 415, as further described herein in accordance with embodiments of the present invention.

Figure 5:
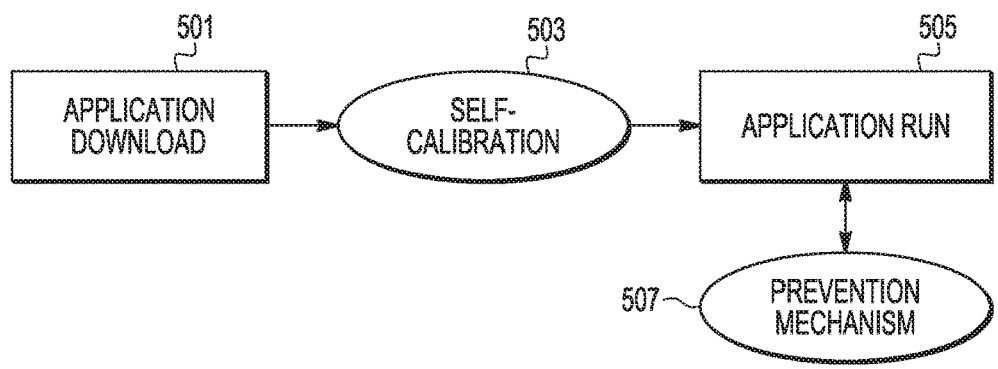
FIG. 5 illustrates a flowchart diagram of power consumption management processes configured in accordance with embodiments of the present invention.

FIG. 5 illustrates an interaction of power consumption management processes configured in accordance with embodiments of the present invention. When integrated circuitry within the integrated circuit 100 (which may include all or a portion of the integrated circuitry 103) initiates the running of an application program, it may download instructions, etc. associated with an application program (process block 501), such as from a memory device (e.g., the memory device 1203 described herein with respect to FIG. 12) to then run that application program (process block 505). Embodiments of the present invention are configured so that a self-calibration process 503 can be performed between the application program download 501 and the application program run 505, which may be utilized to establish initial baseline power settings of which power sections 101 within the integrated circuitry 103 can be turned off during the running of the application program 505. Correspondingly, the self-calibration process 503 is implemented to determine which one or more of the N power section(s) 101 within the integrated circuitry 103 will be turned on (e.g., by application or transmission of a clock signal to each of the turned on power section(s) 101 (see FIG. 3)) while the application program is run (e.g., with the data outputs of the integrated circuit 100 disabled). This self-calibration process 503 is described in more detail with respect to FIG. 6.

After the establishment of the initial baseline power settings by the self-calibration process 503, the application program is then run 505 in a normal manner (e.g., with the data outputs of the integrated circuit 100 enabled) by the integrated circuit 100 (which may include all or a portion of the integrated circuitry 103) for performing the various operational instructions within the application program.

Embodiments of the present invention may also implement a prevention mechanism process 507, which is configured to dynamically adjust the initial baseline power settings established by the self-calibration process 503 in order to accommodate, in a dynamic manner, the operational needs of the application program on a continuous basis. For example, during the running of the application program 505, the prevention mechanism process 507 can temporarily adjust the initial baseline power settings for mismatches between the initial baseline power settings established by the self-calibration process 503 and the dynamically determined actual operational needs of the running application program. As a result, the prevention mechanism process 507 may be implemented to at least temporarily turn on one or more power sections 101 that were previously turned off by the initial baseline power settings. The prevention mechanism process 507 is described in more detail with respect to FIG. 10.

Figure 6:
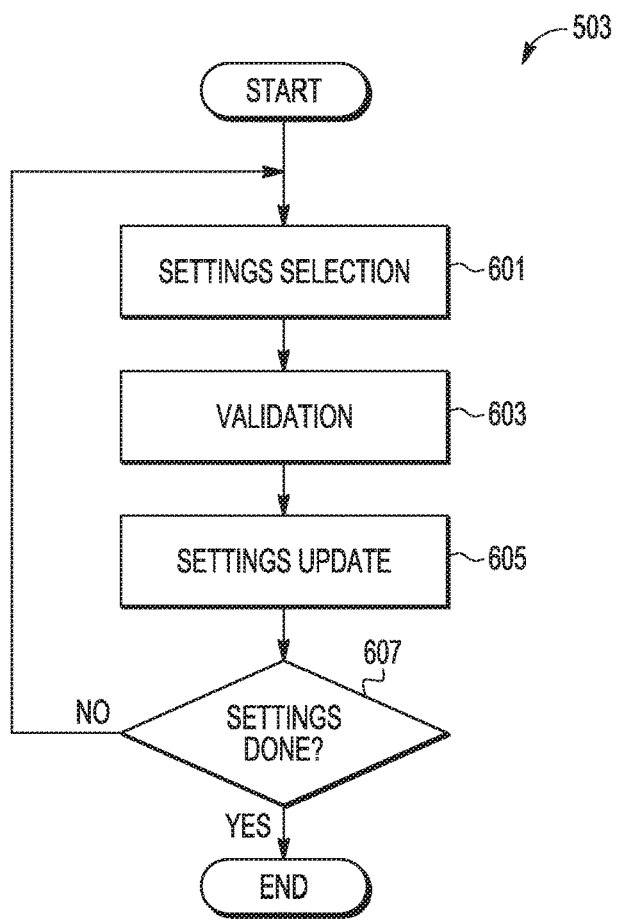
FIG. 6 illustrates a flowchart diagram of a self-calibration process configured in accordance with embodiments of the present invention.

FIG. 6 illustrates a flowchart diagram of processes configured for implementing the self-calibration process 503 in accordance with embodiments of the present invention. The self-calibration process 503 may be implemented as one of the calibration algorithms 401 previously introduced with respect to FIG. 4. The self-calibration process 503 may be configured to Start when the application program to be run within the integrated circuitry 103 is downloaded (see process block 501 described with respect to FIG. 5). For example, referring to FIG. 5, when an application program is downloaded 501, circuitry within the integrated circuit 100 may be configured, in a well-known manner, to send a signal over the signal lines 415 to the central controller 201 to Start the self-calibration process 503. Alternatively, embodiments of the present invention may be configured to Start the self-calibration process 503 upon activation of a user-initiated input received by the central controller 201 via a signal line 415, such as through an implementation of a manually activated hardware or software button (e.g., a display screen GUI (graphic user interface) (not shown)). As a consequence, a user may initiate a recalibration of the baseline power settings at any time, as desired. Alternatively, the self-calibration process 503 may be initiated to Start by the integrated circuit 100 manufacturer (e.g., via s signal line 415) before sending the integrated circuit 100 to the end user.

With any of the foregoing alternatives, the self-calibration process 503 may be initiated to Start as a result of a modification of a configuration register 407 within the central controller 201 (e.g., a pertinent configuration register 407 has its value changed from a logic 0 to a logic 1) as a result of a receipt of a signal via a user or system input signal line 415. The configuration register 407 may also be configured to store one or more values preset by the integrated circuit manufacturer to Start the self-calibration process 503 as a function of what type of application program is downloaded in process block 501.

In process block 601 of the self-calibration process 503, an initial set of baseline power settings are selected for configuring the system accordingly. The setting selection process 601 may be implemented by one or more various algorithms stored within the calibration algorithms 401 of the central controller 201. Non-limiting examples of such settings selection algorithms are described herein with respect to FIGS. 7-9. Nevertheless, the settings selection process 601 performs one or more algorithms for selecting an initial baseline of which of the power sections 101 are to be turned on and which are to be turned off during a running of the application program 505 (see FIG. 5).

Thereafter, a validation process 603 may be performed by the self-calibration process 503 as one of the calibration algorithms 401, whereby circuitry that includes at least a portion of the integrated circuitry 103 runs the application program with the initial set of baseline power settings selected in process 601. Note that while the self-calibration process 503 is being performed, the central controller 201 may be configured to signal circuitry within the integrated circuit 100 to prevent output of any data signals to a device utilizing the integrated circuit 100, since it is likely that such a device would not operate in a desired or satisfactory manner. The validation process 603 then determines whether the application program successfully runs or fails to properly run utilizing the selected baseline power settings. Determining whether the application program successfully runs or fails can be performed using various well-known techniques. For example, if during the running of the application program by the validation process 603, one or more errors are produced, such errors (also referred to herein as "software errors" or "runtime errors") will be noted within well-known error registers (e.g., error registers 1209 in FIG. 12) commonly implemented within integrated circuitry. Referring to FIG. 4, such error signals indicating a failure of the application program to successfully run may be received over one or more signal lines 413 by the central controller 201. For purposes of embodiments of the present invention, a successful running of an application program occurs when no errors are generated by the running of the application program.

Then, during the settings update process 605, if any application program errors are received by the central controller 201 during the validation process 603, the self-calibration process 503 may record (such as within either or both of the power section on/off registers 403 and the power section color registers 405) that the baseline power settings selected by the setting selection algorithm performed in the settings selection process 601 are not acceptable. For example, such a settings selection algorithm may have made a first selection (e.g., see FIG. 8) to set a particular power section 101 (e.g., power section 101*a*) to be turned off in the settings selection process 601, while other power sections were set to be turned on. Then, during the validation process 603, any application program errors were received by the central controller 201, the settings update process 605 will record (e.g., in either or both of the registers 403 and 405) that this particular power section 101 (e.g., power section 101*a*) should not be selected to be turned off within the initial baseline power settings being established by the self-calibration process 503. However, if no errors were received by the central controller 201 during the validation process 603, then the settings update process 605 may record (e.g., in either or both of the registers 403 and 405) that this particular power section 101 (e.g., power section 101*a*) can be selected to be turned off within the initial baseline power settings being established by the self-calibration process 503.

In process block 607, the self-calibration process 503 may determine whether establishment of the initial baseline power settings has now been finally accomplished. That is, it may be determined whether the self-calibration process 503 has completed its determination of which power sections 101 can be turned on and off within the integrated circuitry 103. If not, the process 503 repeats by returning to process block 601. For example, within embodiments of the present invention, the self-calibration process 503 may be configured to determine in process block 607 that the establishment of the initial baseline power settings has been finally accomplished after a predetermined number of the N power sections 101 have been evaluated by the validation process 603, or after a predetermined number of the N power sections 101 have been selected by the process blocks 601, 603, and 605 that they can be turned off and still result in a successful running of the application program. Values for either of the foregoing "predetermined numbers" may be initially set by the integrated circuit manufacturer within the algorithms utilized by the self-calibration process 503, or may be selected by a user, such as by manual input via a signal line 415 in a well-known manner, which values can then be stored within the configuration registers 407 for access by the algorithms utilized by the self-calibration process 503. If the initial baseline power settings have been finally established, then the self-calibration process 503 Ends. It is at this time that the application program is allowed to normally run within the integrated circuitry 103 (see the process block 505 previously described with respect to FIG. 5). This may be performed by the central controller 201 being configured to send in a well-known manner a signal to circuitry within the integrated circuit 100 to begin running the application program 505 in a normal manner (e.g., enabling the integrated circuit 100 to output data signals to a device utilizing the integrated circuit 100).

Referring to FIG. 4, as previously described, results of the self-calibration process 503 may be recorded within the power section on/off registers 403 and/or the power section color registers 405 within the central controller 201. For purposes of describing embodiments of the present invention, certain categories of power section designations will hereinafter be described utilizing the color designations of Blue, Orange, and Green. Note, however, that embodiments of the present invention may designate these power section categories utilizing any appropriate designations, and the use of these color designations is solely for purposes of illustration.

Results of the performance of the self-calibration process 503 establishes an initial baseline indicating which of the N power sections 101 should be turned on for the successful running of an application program in process block 505. These may be categorized as the Blue power section(s) 701. In other words, the self-calibration process 503 has determined that if any of the power section(s) 101 categorized as Blue power sections 701 are not turned on while the application program is running, there is a likelihood of a failure of the running of the application program (e.g., one or more application program errors are produced). Taking the example previously described with respect to FIG. 4, the self-calibration process 503 may categorize a particular power section 101 (e.g., power section 101*a*) as a Blue power section 701 because an application program error was received by the central controller 201 during the validation process 603 because that particular power section had been turned off by an algorithm within the previous settings selection process 601. As a result, the settings update process 605 will record in the power section color registers 405 that this particular power section 101 is to be categorized as a Blue power section 701, and may also record in the power section on/off registers 403 that this particular power section 101 is to be turned on within the initial baseline power settings.

The power section(s) 101 categorized by the self-calibration process 503 as Orange power section(s) 702 are those power section(s) 101 that are not required to be turned on for successful operation of the application program, but for which the central controller 201 sensed there to be activity within those power section(s) 101 during the validation process 603. In other words, no error signals were received during the validation process 603 while any of these power section(s) 101 were turned off; nevertheless, during the validation process 603, the central controller 201 received one or more signals over the signal lines 204 that there was some activity occurring within these power section(s) 101. Recall that activity may be sensed by the central controller 201 as a result of the reception of one or more input data signals received by the pertinent power section(s) 101. For example, under such a condition, the self-calibration process 503 may categorize a particular power section 101 (e.g., power section 101*b*) as an Orange power section 702 because an application program error was not received by the central controller 201 during the validation process 603. As a result, the settings update process 605 may record in the power section color registers 405 that this particular power section 101 is to be categorized as an Orange power section 702, and may also record in the power section on/off registers 403 that this particular power section 101 is to be turned off within the initial baseline power settings.

Note, however, that embodiments of the present invention may enable the integrated circuit manufacturer and/or the end user to configure the self-calibration process 503 to instruct the settings update process 605 to record in the power section on/off registers 403 that certain ones, or all, power sections 101 categorized as Orange power sections 702 are to be turned on within the initial baseline power settings established by the self-calibration process 503. Such a configuration option may be stored within the configuration registers 407 as a result of such an input received by the central controller 201 via the user or system input signal lines 415. As a result, the settings update process 605 may be configured to first check for such stored inputs within the configuration registers 407 before recording in the power section on/off registers 403 whether a particular power section 101 categorized as an Orange power section 702 is to be set as turned on or turned off within the established initial baseline power settings.

Results of the performance of the self-calibration process 503 may also determine which of the power section(s) 101 do not need to be turned on for successful running of the application. In other words, the self-calibration process 503 determines that these power section(s) 101 can be turned off. These may be categorized by the settings update process 605 as Green power section(s) 703. The Green power section(s) 703 are those one or more power sections 101 in which no activity was sensed by the central controller 201, and the central controller did not receive any application program error signals when these power section(s) 101 were turned off, during the validation process 603. For example, the settings update process 605 will record in the power section color registers 405 that such power section(s) 101 are categorized as Green power section(s), and may record in the power section on/off register 403 that such power section(s) 101 are to be turned off within the initial baseline power settings established by the self-calibration process 503.

Figures 7, 8, 9:
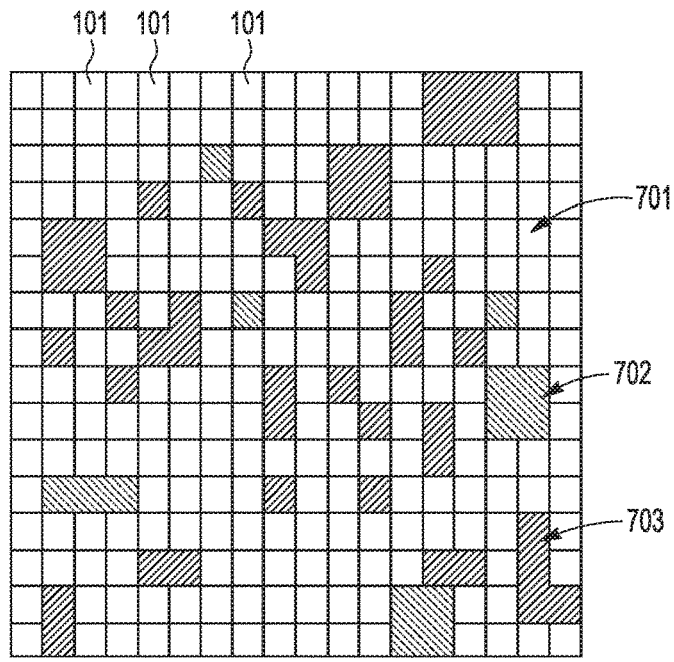
FIG. 7 depicts results of an exemplary self-calibration process for identifying various types of power sections, in accordance with embodiments of the present invention.
FIG. 8 illustrates an exemplary self-calibration algorithm for utilization within the self-calibration process illustrated in FIG. 6.
FIG. 9 illustrates an example of a performance of a recalibration process as described with respect to FIG. 11.

FIG. 7 is a theoretical depiction indicating an example of which of the power section(s) 101 in the integrated circuitry 103 (see FIG. 1) have been categorized within an exemplary initial baseline power settings established by the self-calibration process 503 as Blue power section(s) 701, Orange power section(s) 702, and Green power section(s) 703. For purposes of this non-limiting example, the power sections 101 categorized as Blue power sections 701 are illustrated in FIG. 7 as clear (i.e., unshaded) blocks, the power sections 101 categorized as Orange power sections 702 are illustrated as groups of one or more blocks with a shading of dashed diagonal lines, and the power sections 101 categorized as Green power sections 703 are illustrated as groups of one or more blocks with a shading of solid diagonal lines. Referring to FIG. 4, within the central controller 201, there may be a power section color register 405 designated for each of the power section(s) 101 within the integrated circuitry 103. Each of these power section color registers 405 is configured to indicate for each power section 101 whether that power section 101 has been categorized as a Blue power section 701, an Orange power section 702, or a Green power section 703.

Referring now to FIG. 8, there is illustrated a non-limiting example of a type of algorithm which may be implemented by the settings selection process 601 in the self-calibration process 503 for establishing the initial baseline power settings. FIG. 8 shows a table depicting such an exemplary algorithm for determining which power section(s) 101 (e.g., power sections 101a, 101b, . . . 101N) to be turned on and off for each iteration of the algorithm. In a first selection of the exemplary algorithm, a first power section 101 (e.g., the power section 101a) is turned off by the settings selection process 601. This may be implemented by the central controller 201 designating a power section on/off register 403 pertaining to the power section 101a with a logic 0 value, indicating that it is to be turned off during this iteration of the algorithm. Referring to FIG. 3, this may be implemented by the central controller 201 transmitting this logic 0 value from the configuration register 407 over the signal line 204 to the logic OR gate 303. The output of the logic OR gate 303 will be a logic 0 value that is received by the logic AND gate 305, resulting in the clock signal for this particular power section 101a not being transmitted over (e.g., being deactivated) the signal line 206 to the power section 101a. The central controller 201 may store a value (e.g., a logic 1 value) in all of the other power section on/off registers 403 pertaining to all of the other power section(s) 101 (i.e., the power sections 101b, 101c, . . . 101N). The validation process 603 within the self-calibration process 503 will then run the application program to determine if any errors result. If no errors are received by the central controller 201, then the application program is designated by the validation process 603 as passing (i.e., not failing). If no activity within the power section 101a is sensed by the central controller 201, the settings update process 605 will then record in the power section color registers 405 that this power section 101a is to be categorized as a Green power section 703, and may record in the power section on/off registers 403 that this power section 101a is to be turned off within the initial baseline power settings by maintaining the logic 0 value within its particular power section on/off register 403. However, if activity within the power section 101a is sensed by the section controller associated with the power section 101a (e.g., the section controller 202a), the settings update process 605 may record in the power section color registers 405 that this power section 101a is to be categorized as an Orange power section 702. The settings update process 605 may then record in the power section on/off registers 403 that this power section 101a is to be turned off within the initial baseline power settings. However, as previously described, the settings update process 605 may be configured to first check if the configuration registers 407 have been previously programmed by the integrated circuit manufacturer and/or an end user to set this particular power section 101a to be turned on or turned off regardless whether it has been categorized by the settings update process 605 as an Orange power section 702.

However, if one or more error signals are received by the central controller 201 during the validation process 603 for this iteration of the algorithm, the settings update process 605 will then record in the power section color registers 405 that this power section 101a is to be categorized as a Blue power section 701 as needing to be maintained as turned on within the initial baseline power settings, and will thus switch the power section on/off register 403 pertaining to this power section 101a to a logic 1 value.

The self-calibration process 503 may then proceed to the second selection within this particular exemplary algorithm by turning off the power section 101b while turning on all of the other power sections (e.g., the power sections 101a, 101c, . . . 101N) unless the settings update process 605 determines that the self-calibration process 503 should End (such as resulting from a preset configuration, as previously described). If the self-configuration process 503 does not End, it will then be run again by repeating the processes 601, 603, and 605. This exemplary algorithm may then repeated for each of the N power sections (e.g., power settings 101*c* . . . 101N).

The result of performing the self-calibration process 503 is that for each of the N power sections (e.g., 101*a*, 101*b*, 101*c*, . . . 101N) that were determined to be capable of being turned off but still permitting the successful operation of the application program (i.e., no error signals were received by the central controller 201), these particular power section(s) 101 will be designated as Green power section(s) 703 within the power section color registers 405. For each of the power section(s) 101 that were determined to be capable of being turned off but yet the application program successfully operated, and these power section(s) 101 were sensed to have no activity (e.g., no input signal(s) were sensed as received by the power section(s) 101), those power section(s) 101 will be designated as Blue power section(s) 701 within the power section color registers 405. For each of the power section(s) 101 that were determined by the self-calibration process 503 to be capable of being turned off but still permitting the successful operation of the application program, yet activity was sensed within the power section(s) 101 (e.g., one or more input data signals were sensed as being received by the power section(s) 101), those power section(s) may be designated as Orange power section(s) 702 within the power section color registers 405.

Recall from the foregoing that the Green power sections 703 are those power section(s) 101 for which the application program did not fail when these power section(s) 101 were turned off during the initial baseline power setting during performance of the self-calibration process 503, and for which no activity was sensed within these power section(s) 101 while the application program was running during the validation process 603. Further recall that after the self-calibration process 503 is completed, the central controller module 102 then signals circuitry within the integrated circuit 100 that the application program may now run in a normal manner (see process block 505 in FIG. 5). During the running of the application program 505, the central controller 201 may continue to monitor for data processing activity (e.g., actual, or at least possible, data processing activity) occurring within any or all of the power section(s) 101. This may be performed by the prevention mechanism process 507, which is further described with respect to FIG. 10.

Figure 10:
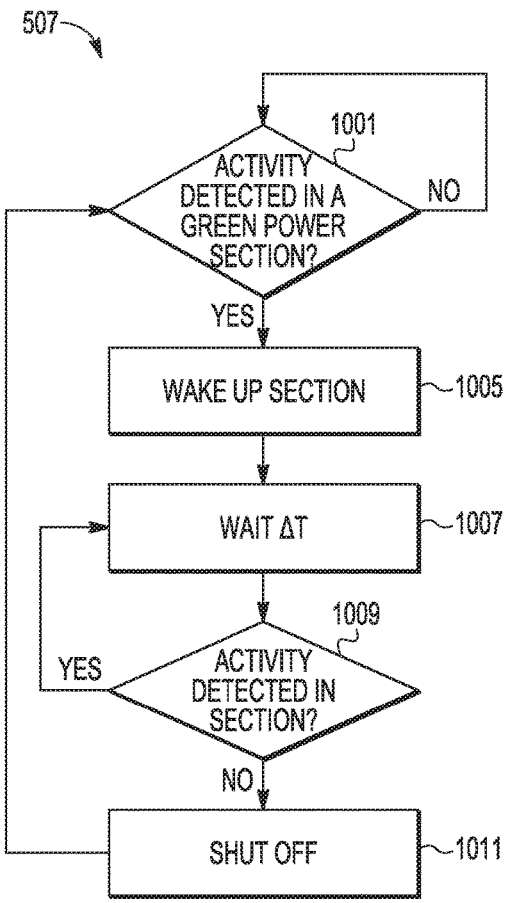
FIG. 10 illustrates a flowchart diagram of a prevention mechanism process for preventing failures within the integrated circuitry, in accordance with embodiments of the present invention.

Referring to FIG. 10, in process block 1001, the prevention mechanism process 507 monitors for when the central controller 201 detects at least possible data processing activity occurring within any power section 101 categorized as a Green power section 703 (i.e., sensed by the event detector 301 of the section controller 202 pertaining to the power section 101). If the process block 1001 determines that one or more input data signals have been sensed in a power section 101 categorized as a Green power section 703 within the power section color registers 405, the prevention mechanism 507 proceeds to process block 1005. The prevention mechanism process 507 may thus be configured to detect, during the running of the application program (process block 505), when any one or more of the turned off power sections 101 within the integrated circuitry 103 (which were designated as Green power section(s) 703) needs to be turned on so that the application program does not fail. Essentially, the prevention mechanism process 507 proceeds to the process block 1005 because there has been a mismatch between the initial baseline power settings established by the self-calibration process 503 and what may actually be required by the running application program during a period of time. Such a mismatch may occur because the application program encounters one or more new (e.g., unanticipated) operating conditions, and the application program may fail to satisfactorily operate under such one or more newly encountered operating conditions because the application program now requires the services (i.e., operations) of circuit elements within one or more turned off power section(s) 101. This is because such detected activity indicates that such power section(s) 101 are now receiving one or more input data signals from other circuitry within the integrated circuitry, which may be an indicator that functions performed by the circuit elements within these power section(s) are now required by the application program.

In process block 1005, the running of the application program by the system may be paused in a well-known manner for a predetermined period of time in order to permit the central controller 201 to wake up (i.e., turn on) this particular power section 101. A counter 409 within the central controller 201 may be utilized for implementing this predetermined period of time. This may be accomplished by the wake up process 1005 turning on this particular power section 101 through the application of the clock signal over the signal lines 206 when the central controller 201 sends a logic 1 signal to the logic OR gate 303, which causes the logic AND gate 305 to transmit (e.g., activate) the clock signal to the power section 101, thus activating circuit elements within the power section 101. In process block 1007, while running the application program with this particular power section 101 turned on, a predetermined time period, ΔT, (e.g., a predetermined number of clock signals) is allowed to pass.

In process block 1009, the prevention mechanism process 507 determines whether the running of the application program 505 continues to require the turning on of this particular power section 101. This may be performed by the prevention mechanism process 507 determining if activity is still being sensed within this particular power section 101 after passage of the time period ΔT (e.g., by sensing whether any input data signals are continuing to be received by the particular power section 101). If this is correct, the prevention mechanism process 507 returns to process block 1007 to continue to keep this particular power section 101 turned on for another time period ΔT. If the running of that application program does not require the turning on of this particular power section 101 (e.g., no activity sensed), the prevention mechanism process 507 proceeds to process block 1011 to then turn off this particular power section 101 (e.g., by deactivating the clock signal), and the prevention mechanism process 507 returns to process block 1001.

Note that embodiments of the present invention are not limited to the prevention mechanism process 507 being able to handle only a single power section 101 at a time. Instead, embodiments of the present invention may be configured so that the prevention mechanism process 507 is able to detect and turn on a plurality of power sections 101 previously designated as Green power sections 703, either simultaneously or during concurrent staggered periods of time. Moreover, referring to FIG. 5, embodiments of the present invention may implement the self-calibration process 503 while omitting the prevention mechanism process 507.

Recall that the Orange power sections 702 are those power section(s) 101 for which the application program did not fail when these power section(s) were turned off during establishment of the initial baseline power settings by the self-calibration process 503, but for which activity was sensed within these power section(s) 101 during the validation process 603.

It should be further noted that the self-calibration process 503 may have determined that none of the power sections 101 within the integrated circuitry 103 are to be categorized as Orange power sections 702. It should be further noted that embodiments of the present invention may be implemented to not permit the categorization of any power section(s) 101 as Orange power sections 702. Instead, such power section(s) 101 may be categorized as Blue power section(s) 701 during the self-calibration process 503 so that such power section(s) 101 are maintained as turned on for running of the application program.

However, if the self-calibration process 503 had determined that one or more of the power sections 101 were to be categorized as an Orange power section 702, embodiments of the present invention may implement a process for handling such Orange power sections 702 if there is a failure of the application program. FIG. 9 illustrates a non-limiting example in which the self-calibration process 503 designated that the power sections 101a and 101N were to be turned off within the initial baseline power settings, and also that these power sections 101 were categorized as Orange power sections 702.

Because a power section(s) 101 categorized as an Orange power section 702 is sensed by the event detector 301 (see FIG. 3) as receiving one or more input data signals from other circuitry, such power section(s) 101 categorized as Orange power section(s) 702 cannot be handled in the same way as the power section(s) 101 categorized as Green power section(s) 703 by the prevention mechanism process 507. Recall that the prevention mechanism process 507 may be performed upon the detection of activity within a previously turned off power section 101 in which such activity was not previously present.

Figure 11:
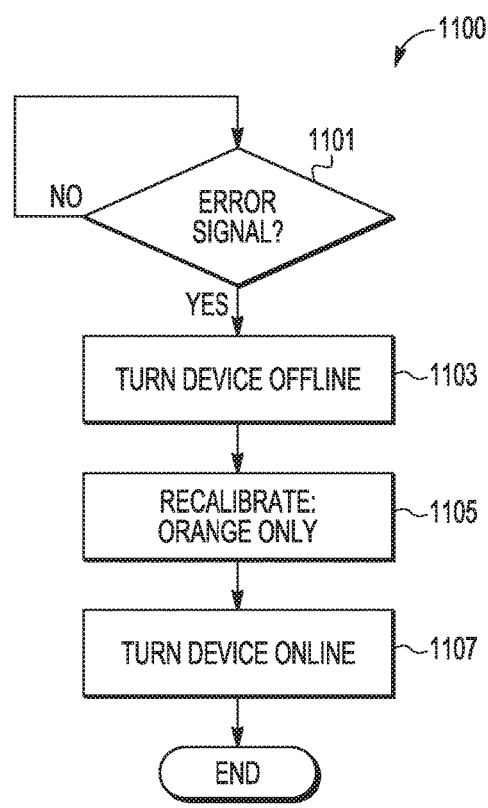
FIG. 11 illustrates a flowchart diagram of a recalibration process configured in accordance with embodiments of the present invention.

Therefore, any power section(s) 101 designated as Orange power section(s) 702 may be handled by a recalibration process 1100 as described with respect to FIG. 11 to handle a situation where during the running of the application (see the process block 505 in FIG. 5), and subsequent to the establishment by the self-calibration process 503 of the initial baseline power settings, the application program fails (e.g., produces one or more errors) for some reason. The recalibration process 1100 may be implemented as one of the calibration algorithms 401 within the central controller 201. As an example, the application program may fail as a result of a receipt of different input data signals into a power section 101 designated as an Orange power section 702 (which was designated within the power section on/off registers 403 as being turned off during the running of the application program). In such an example, even though different input data signals are now being received by such an Orange power section 702, an edge detection mechanism implemented by the section controller 202 associated with that particular Orange power section 702 may not be able to discern such a change in an input data signal (e.g., change from a logic 1 value to a logic 0 value, or vice versa).

Nevertheless, because there has now been a failure in the running of the application program, there may be a desire to turn on any one or more, or all, of the power section(s) 101 designated as Orange power section(s) 702 so that the application program can successfully run.

Note that the recalibration process 1100 may be performed on any one or more, or all, of the power section(s) 101 designated as Orange power sections 702. The recalibration process 1100 may start upon the detection of a failure of the running of the application program in the process block 1101. Thus, the recalibration process 1100 may be configured to monitor for the receipt of any application program errors by the central controller 201 via the application errors signal lines 413. Such a failure of the running of the application program may indicate that there has been a mismatch between the initial baseline power settings established by the self-calibration process 503 and the now current operational needs of the application program, indicating that the application program now requires circuit elements within one or more turned off power sections 101 designated as Orange power sections 702 to successfully perform an operation.

Because of the nature of the Orange power sections 702 (i.e., turned off but still sensing activity), it may be ineffective to merely repeat the previously described self-calibration process 503, since such a self-calibration process 503 may not be able to generate a reliable update to the initial baseline power settings, even during this particular state of the running of the application program. Furthermore, it may not be desired to repeat such a self-calibration process 503 because such a process would take too long to perform.

Within the recalibration process 1100, upon the detection of a failure of the running of the application program in step 1101, the process 1100 proceeds to step 1103 to temporarily turn off the device implementing the integrated circuitry 103 (e.g., by turning off the integrated circuit 100, or even a device within which the integrated circuit 100 is implemented). Such a turning off of the integrated circuit 100 may be accomplished in a well-known manner in which output signals from the integrated circuit 100 are deactivated. Then, in step 1105, a recalibration of the initial baseline power settings is performed for only the one or more power sections 101 previously categorized as Orange power sections 702. For example, a process similar to the self-calibration process 503 may be performed as one of the calibration algorithms 401 within the central controller 201 in order to identify which Orange power section 702 caused the failure of the running of the application program as a result of the receipt of new (or different) input data signals into that particular power section 101. A result of the recalibration process 1105 is an update to the initial baseline power settings, which may include a determination that one or more of the previously categorized Orange power sections 702 are now required to be always turned on. Such a designation may be stored within the power sections on/off registers 403. Additionally, these one or more power sections 101 previously categorized as Orange power sections 702 may now be categorized within the power section color registers 405 as Blue power sections 701. Thereafter, in step 1107, the device is returned to an online status (e.g., by turning on the integrated circuit 100 or a device in which it is implemented). The recalibration process 1100 then Ends, and the application program is permitted to run 505 normally.

Figure 12:
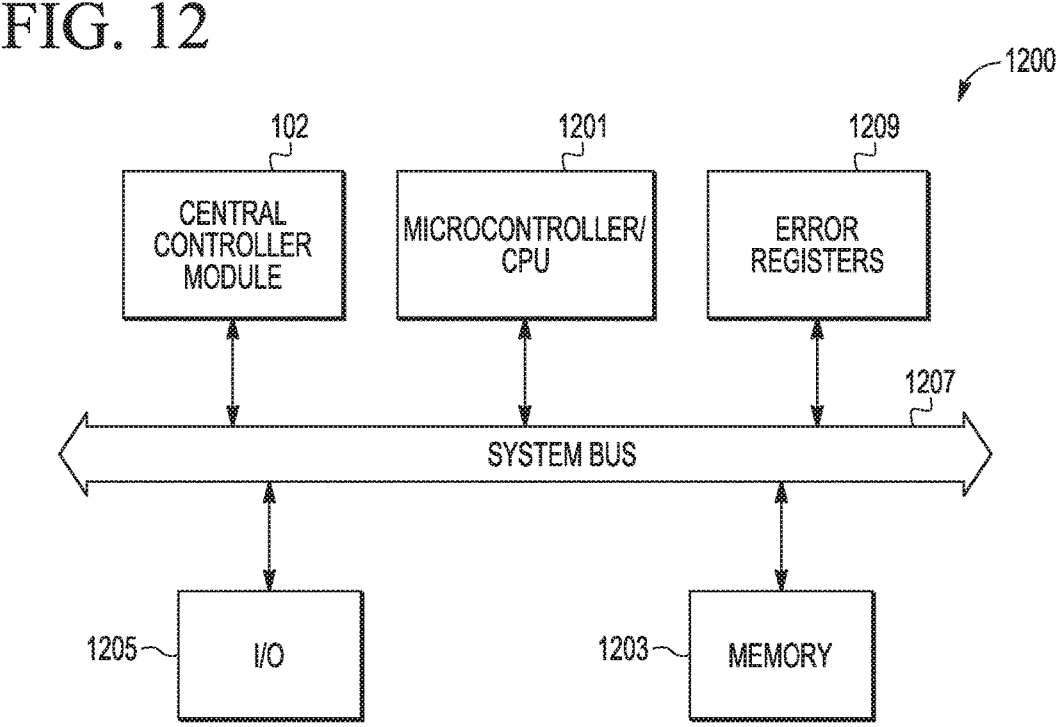
FIG. 12 illustrates a block diagram of a data processing system configured in accordance with embodiments of the present invention.

With reference now to FIG. 12, a block diagram illustrating a data processing system 1200 is depicted in which aspects of embodiments of the invention may be implemented. Microcontroller or processor ("CPU") 1201, volatile and/or non-volatile memory 1203, and any input/output (I/O) devices 1205 may be connected to a system bus 1207. Additional connections to the system bus 1207 may be made through direct component interconnection or through add-in boards.

An operating system may be run on the microcontroller or processor 1201 and used to coordinate and provide control of various components within the system 1200 in FIG. 12.

The operating system may be a commercially available operating system. An object oriented programming system such as Java may run in conjunction with the operating system and provide calls to the operating system from Java programs or programs executing on the system 1200. Instructions for the operating system, the object-oriented operating system, and programs may be located on memory 1203 storage devices, such as a hard disk drive, and may be loaded into a volatile memory 1203 for execution by the microcontroller or processor 1201.

Those of ordinary skill in the art will appreciate that the hardware in FIG. 12 may vary depending on the implementation. Other internal hardware or peripheral devices, such as flash ROM (or equivalent nonvolatile memory) or optical disk drives and the like, may be used in addition to or in place of the hardware depicted in FIG. 12. Also, processes of the present invention may be applied to a multiprocessor computer system.

As another example, the system 1200 may be a stand-alone system configured to be bootable without relying on some type of network communication interface, whether or not the system 1200 includes some type of network communication interface. As a further example, the system 1200 may be an embedded controller, which is configured with ROM and/or flash ROM providing non-volatile memory storing operating system files or user-generated data.

The depicted example in FIG. 12 and above-described examples are not meant to imply architectural limitations. Further, a computer program form of the present invention may reside on any computer readable storage medium (i.e., floppy disk, compact disk, hard disk, tape, ROM, RAM, etc.) used by a computer system. (The terms "computer," "system," "microcontroller," and "computer system" may be used interchangeably herein.)

Aspects of the present invention provide a method for managing a consumption of power within circuitry, wherein the circuitry is partitioned into power sections, wherein each of the power sections is configured so that its consumption of power is independently controllable from every other power section, wherein the consumption of power by each of the power sections is less when the power section is turned off than when the power section is turned on, the method determining that one or more of the power sections can be turned off for a successful running of an application program within the circuitry, and running the application program within the circuitry with the one or more power sections turned off. The method may further determine that a particular power section of the one or more turned off power sections needs to be turned on for successful running of the application program within the circuitry, turn on the particular power section of the one or more turned off power sections for a period of time during the running of the application program within the circuitry, and turn off the particular power section of the one or more turned off power sections after the period of time for a remainder of time during the running of the application program within the circuitry. The determining that one or more of the power sections can be turned off for the successful running of the application program within the circuitry may further determine that power sections other than the one or more turned off power sections need to be turned on for the successful running of the application program within the circuitry. The successful running of the application program within the circuitry may be determined when no errors are produced by the running of the application program within the circuitry. The turning off of the one or more power sections may be performed by deactivation of a clock signal from the one or more power sections. The turning off of the one or more power sections may be performed by deactivation of a power supply voltage from the one or more power sections. The determining that one or more of the power sections can be turned off for the successful running of the application program within the circuitry and the determining that power sections other than the one or more turned off power sections need to be turned on for the successful running of the application program within the circuitry may be performed as part of a self-calibration process that includes a settings selection process configured to determine a first selection of which of the one or more power sections are to be turned on and which of the one or more power sections are to be turned off, a validation process configured to evaluate if running the application program produces an error as a result of the first selection, a settings update process configured to determine that the one or more power sections turned off by the first selection need to be turned on for the successful running of the application program if the error is produced during the validation process, wherein the settings update process may be configured to determine that the one or more power sections turned off by the first section can be turned off during the running of the application program within the circuitry if no errors are produced during the validation process, and using results of the settings update process to establish initial baseline power settings that determine (1) which of the one or more power sections within the circuitry need to be turned on, and (2) which of the one or more power sections within the circuitry can be turned off for the successful running of the application program. The self-calibration process may further include determining whether the settings selection process needs to determine a second selection of which of the one or more power sections are to be turned on and which of the one or more power sections are to be turned off for another iteration of the validation process and the settings update process, wherein the second selection is different from the first selection, performing the validation process and the settings update process on the second selection if it is determined that the second selection needs to be evaluated by the self-calibration process, and using results of evaluations of the first and second selections by the validation process to produce the initial baseline power settings. The self-calibration process may further include determining that a particular power section of the one or more power sections can be turned off for the successful running of the application program even when the particular power section is receiving an input data signal from elsewhere in the circuitry. When the particular power section is turned off during the running of the application program, the method may further include turning on the particular power section when the running of the application program produces a runtime error.

Aspects of the present invention provide a system for managing consumption of power within integrated circuitry, wherein the integrated circuitry is partitioned into power sections, wherein each of the power sections is configured so that its consumption of power is independently controllable from other power sections, wherein the system includes a central controller configured to determine that one or more of the power sections can be turned off for a successful running of an application program within the integrated circuitry, and circuitry configured to run the application program within the integrated circuitry with the one or more power sections turned off. The circuitry configured to run the application program within the integrated circuitry with the one or more power sections turned off may include a section controller for each of the power sections within the integrated circuitry, wherein each section controller may include circuitry configured to receive a first signal from the central controller that designates whether its power section is to be turned on or turned off during the running of the application program within the integrated circuitry, circuitry configured to apply a clock signal to its power section in response to the first signal having a first value designating that the power section is to be turned on during the running of the application program within the integrated circuitry, and circuitry configured to deactivate the clock signal from its power section in response to the first signal having a second value designating that the power section is to be turned off during the running of the application program within the integrated circuitry. The central controller may further include circuitry configured to determine that a particular power section of the one or more turned off power sections needs to be turned on for a successful running of the application program. The central controller may be configured to send the first signal having the first value to a particular section controller associated with a particular power section of the one or more turned off power sections in response to receipt of an indication of data processing activity occurring within the particular power section. The particular section controller pertaining to the particular power section may further include an event detector configured to send the indication of the activity occurring within the particular power section in response to a sensing of a receipt of an input signal received by the particular power section. The particular section controller may further include circuitry configured to turn on the particular power section in response to (1) receipt from the event detector of the indication of the activity occurring within the particular power section, and (2) receipt from the central controller of the first signal having the first value instructing that the particular power section needs to be turned on for a predetermined period of time during the running of the application program. The particular section controller may further include circuitry configured to turn off the particular power section after the predetermined period of time in response to receipt from the central controller of the first signal with the second value even when there is the receipt from the event detector the indication of the activity occurring within the particular power section.

Aspects of the present invention provide an integrated circuit including integrated circuitry delineated into first and second power sections, a first section controller coupled to the first power section, a second section controller coupled to the second power section, a central controller coupled to the first and second section controllers, wherein the central controller and the first section controller are configured to control a power consumption within the first power section, and wherein the central controller and the second section controller are configured to control a power consumption within the second power section, wherein the central controller is configured to control the power consumption within the first power section independently from the power consumption within the second power section, wherein the central controller is configured to determine that the second power section can be controlled so that the power consumption within the second power section can be decreased for a successful running of an application program within the integrated circuit, and circuitry configured to run the application program within the integrated circuit with the second power section controlled by the central controller and the second section controller to decrease the power consumption within the second power section. The application program may be run within the integrated circuit with the first power section controlled by the central controller and the first section controller so that the power consumption by the first power section is not decreased.

Aspects of the present invention may be a system, a method, and/or a computer program product at any possible technical detail level of integration. Accordingly, aspects of the present invention may take the form of an entirely hardware embodiment, an entirely software embodiment (including firmware, resident software, micro-code, etc.), or embodiments combining software and hardware aspects that may all generally be referred to herein as a "circuitry," "circuit," "module," or "system." The computer program product may include a computer readable storage medium (or media) having computer readable program instructions thereon for causing a processor or controller (e.g., central controller module 102, or microcontroller or CPU 1201 (see FIG. 12)) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. For example, in embodiments of the present invention, computer readable storage medium may be implemented within a memory device within a central controller module 102, or in a separate memory device, such as memory 1203 in FIG. 12. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention (e.g., any one or more of the calibration algorithms 401) may be assembler instructions, instruction-set-architecture ("ISA") instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's device (e.g., implementing the integrated circuit 100), partly on the user's device, as a stand-alone software package, partly on the user's device and partly on a remote device, or entirely on the remote device. In the latter scenario, the remote device may be connected to the user's device through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart diagrams and/or block diagrams of methods, algorithms, processes, apparatus (systems), and computer program products according to embodiments of the invention. It will be understood that each block of the flowchart diagrams and/or block diagrams, and combinations of blocks in the flowchart diagrams and/or block diagrams, can be implemented by computer readable program instructions.

These computer readable program instructions may be provided to a processor (e.g., CPU 1201) of a general purpose computer, special purpose computer, a microcontroller 1201, or other programmable data processing apparatus (e.g., central controller module 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a microcontroller, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, microcontroller, other programmable data processing apparatus, or other device to cause a series of operational steps to be performed on the computer, microcontroller, other programmable apparatus, or other device to produce a computer implemented process, such that the instructions which execute on the computer, microcontroller, other programmable apparatus, or other device implement the functions/acts specified in the flowchart diagram and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference throughout this specification to "an embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations may be not shown or described in detail to avoid obscuring aspects of the invention.

The terminology used herein is for the purpose of describing particular embodiments only and is not intended to be limiting of the invention. As used herein, the singular forms "a," "an," and "the" may be intended to include the plural forms as well, unless the context clearly indicates otherwise.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. Additionally, an item appended with "(s)" means that there may be one or more of such item being referred to within the description.

The corresponding structures, materials, acts, and equivalents of all means or step plus function elements in the claims below may be intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as may be suited to the particular use contemplated.

What is claimed is:

1. A method for managing power consumption within circuitry, wherein the circuitry is partitioned into power sections, wherein each of the power sections is configured so that its power consumption is independently controllable from every other power section, wherein the power consumption by each of the power sections is less when the power section is turned off than when the power section is turned on, the method comprising:
  determining that a first group of one or more of the power sections can be turned off for a successful running of an application program within the circuitry;
  recording a designation of the first group in a set of registers;
  determining that a second group of one or more of the power sections, other than the one or more of the power sections in the first group, needs to be turned on for the successful running of the application program within the circuitry;
  recording a designation of the second group in the set of registers, wherein the designations of the first and second groups represent an initial baseline setting recorded within the set of registers designating which of the one or more power sections are to be turned on and which of the one or more power sections are to be turned off for subsequent running of the application program within the circuitry; and
  running the application program within the circuitry in accordance with the initial baseline setting recorded within the set of registers
  wherein the determining that the first group of one or more of the power sections can be turned off for a successful running of the application program within the circuitry further comprises:
  performing a first run of the application program with a first power section in the first group of one or more of the power sections turned off;
  if an application runtime error is produced by the first run of the application program, determining that said first power section in the first group of one or more of the power sections needs to be turned on during the running of the application program; and
  recording in the set of registers that said first power section in the first group of one or more of the power sections is to be designated within the second group of one or more of the power sections.

2. The method as recited in claim 1, further comprising:
  during the running of the application program within the circuitry in accordance with the initial baseline setting, determining that a particular power section designated within the first group needs to be turned on for successful running of the application program within the circuitry;
  turning on the particular power section designated within the first group for a period of time during the running of the application program within the circuitry; and
  turning off the particular power section designated within the first group after passage of the period of time and for a remainder of time during the running of the application program within the circuitry.

3. The method as recited in claim 2, wherein the turning on and subsequent turning off of the particular power section after the period of time is performed without modifying the initial baseline setting recorded in the set of registers.

4. The method as recited in claim 1, wherein the successful running of the application program within the circuitry is determined when no application runtime errors are sensed during the running of the application program within the circuitry.

5. The method as recited in claim 1, wherein the determining that the first group of one or more of the power sections can be turned off for a successful running of the application program within the circuitry further comprises:
  if no application runtime error is produced by the first run of the application program, determining that said first power section in the first group of one or more of the power sections can be turned off during the running of the application program; and
  recording in the set of registers that said first power section in the first group of one or more of the power sections is to be designated within the first group of one or more of the power sections.

6. The method as recited in claim 5, wherein the determining that the first group of one or more of the power sections can be turned off for a successful running of the application program within the circuitry further comprises:
  determining that said first power section in the first group of one or more of the power sections will be turned off during the running of the application program even when data processing activity is sensed to be occurring in said first power section in the first group of one or more of the power sections; and
  recording in the set of registers that said first power section in the first group of one or more of the power sections is to be designated within the first group of one or more of the power sections.

7. The method as recited in claim 1, wherein the determining that the first group of one or more of the power sections can be turned off for a successful running of the application program within the circuitry further comprises:
  performing a second run of the application program with a second power section in the first group of one or more of the power sections turned off;
  if an application runtime error is produced by the second run of the application program, determining that said second power section in the first group of one or more of the power sections needs to be turned on during the running of the application program;
  recording in the set of registers that said second power section in the first group of one or more of the power sections is to be designated within the second group of one or more of the power sections
  if no application runtime error is produced by the second run of the application program, determining that said second power section in the first group of one or more of the power sections can be turned off during the running of the application program; and
  recording in the set of registers that said second power section in the first group of one or more of the power sections is to be designated within the first group of one or more of the power sections.

8. The method as recited in claim 1, further comprising:
  during the running of the application program within the circuitry in accordance with the initial baseline setting, determining that a particular power section designated within the first group of power sections needs to be turned on for successful running of the application program within the circuitry;

reactivating the running of the application program with the particular power section turned on;

after a period of time has passed, turning off the particular power section; and continuing to run the application program after the period of time has passed.

9. The method as recited in claim 1, wherein the circuitry is implemented as an integrated circuit, and wherein each power section is a partition of circuit components separate from other circuit components within the integrated circuit.

10. A method for managing power consumption within circuitry, wherein the circuitry is partitioned into power sections, wherein each of the power sections is configured so that its power consumption is independently controllable from every other power section, wherein the power consumption by each of the power sections is less when the power section is turned off than when the power section is turned on, the method comprising:

determining that a first group of one or more of the power sections can be turned off for a successful running of an application program within the circuitry;

recording a designation of the first group in a set of registers;

determining that a second group of one or more of the power sections, other than the one or more of the power sections in the first group, needs to be turned on for the successful running of the application program within the circuitry;

recording a designation of the second group in the set of registers, wherein the designations of the first and second groups represent an initial baseline setting recorded within the set of registers designating which of the one or more power sections are to be turned on and which of the one or more power sections are to be turned off for subsequent running of the application program within the circuitry; and running the application program within the circuitry in accordance with the initial baseline setting recorded within the set of registers, wherein the recording of the initial baseline setting within the set of registers is performed as part of a self-calibration process that comprises:

a settings selection process configured to determine a first selection of (1) the first group recorded in the set of registers designating which of the one or more of the power sections are to be turned on and (2) the second group recorded in the set of registers designating which of the one or more of the power sections are to be turned off;

a validation process configured to evaluate if running the application program produces an application runtime error as a result of the first selection;

a settings update process configured to determine that one or more of the power sections designated in the set of registers as a member of the first group in the initial baseline setting need to be turned on for the successful running of the application program if the application runtime error is produced during the validation process; and the settings update process configured to determine that one or more of the power sections designated in the set of registers as a member of the first group in the initial baseline setting can continue to be turned off during the running of the application program within the circuitry if no application runtime errors are produced during the validation process.

11. The method as recited in claim 10, wherein the self-calibration process further comprises:

determining whether the settings selection process needs to determine a second selection of (1) the first group recorded in the set of registers designating which of the one or more of the power sections are to be turned on and (2) the second group recorded in the set of registers designating which of the one or more of the power sections are to be turned off for another iteration of the validation process and the settings update process, wherein the second selection is different from the first selection;

performing the validation process and the settings update process on the second selection if it is determined that the second selection needs to be evaluated by the self-calibration process; and using results of evaluations of the first and second selections by the validation process to update the initial baseline power settings recorded in the set of registers.

12. The method as recited in claim 10, wherein the self-calibration process further comprises determining that a particular power section can be designated within the first group of the initial baseline setting even when the particular power section is receiving an input data signal from elsewhere in the circuitry during the validation process.

13. The method as recited in claim 12, further comprising turning on the particular power section when the running of the application program in accordance with the initial baseline setting produces an application runtime error.

* * * * *